(12) United States Patent
Deep

(10) Patent No.: US 6,393,412 B1
(45) Date of Patent: May 21, 2002

(54) METHOD FOR ALLOWING USERS TO PURCHASE PROFESSIONAL SERVICES IN A PRIVATE CHAT ROOM THROUGH A SERVICE BROKERAGE VIA THE INTERNET

(76) Inventor: Peter Deep, 3495 Floyd Ter., Los Angeles, CA (US) 90068

( * ) Notice: Subject to any disclaimer, the term of this patent is extended or adjusted under 35 U.S.C. 154(b) by 0 days.

(21) Appl. No.: 09/401,715

(22) Filed: Sep. 23, 1999

(51) Int. Cl.[7] .............................................. G06F 17/60
(52) U.S. Cl. ...................................... 705/400; 705/418
(58) Field of Search ............................... 705/1, 50, 51, 705/400, 418

(56) References Cited

U.S. PATENT DOCUMENTS

| | | | |
|---|---|---|---|
| 4,992,940 A | * 2/1991 | Dworkin ....................... 705/26 |
| 5,159,633 A | * 10/1992 | Nakamura .................... 380/30 |
| 5,987,430 A | * 11/1999 | Van Horne et al. ........... 705/34 |
| 6,128,601 A | * 10/2000 | Van Horne et al. ........... 705/34 |

FOREIGN PATENT DOCUMENTS

| | | | |
|---|---|---|---|
| JP | 11-184930 | * | 7/1999 |
| WO | WO 99/26153 | * | 5/1999 |

OTHER PUBLICATIONS

Schultze: "A confessional account of an ethnography about knowledge work", MIS Quarterly, Mar. 2000, v24, n1, pp. 43–79.*

* cited by examiner

Primary Examiner—Edward R. Cosimano
(74) Attorney, Agent, or Firm—Lyon & Lyon LLP

(57) ABSTRACT

A method for allowing a user to access a plurality of service providers through a service brokerage via the Internet. The service brokerage establishes accounts with the service providers and the user. Once a user logs in to the service brokerage, the user is presented with a set of private service provider chat rooms that are on on-line. The set can be chosen based upon a predetermined criterion. Once the user selects a chat room of a chosen provider, the service provider must allow the user access to that service provider's chat room. A user profile may be provided to the service provider to aid in the admission process. Once a user is inside a chat room, the chat room is closed and the user and service provider can privately interact in the occupied chat room via the Internet. The service provider can have access to, and modify, a user information file of the user during the session, and the user can have access to the file once the session is over. The user's account is charged with a user service fee, and the service provider's account is credited with a service provider fee, according to the length of time the user spends in the occupied chat room of the service provider.

24 Claims, 5 Drawing Sheets

USER LOGIN PROCESS

USER SELECTION/PURCHASE PROCESS

CHAT ROOM ENTRY

METHOD FOR ALLOWING USERS TO PURCHASE PROFESSIONAL SERVICES IN A PRIVATE CHAT ROOM THROUGH A SERVICE BROKERAGE VIA THE INTERNET

FIELD OF THE INVENTION

The present invention is in the field of methods to provide access to services via the Internet.

BACKGROUND OF THE INVENTION

The economy of the United States, and several other countries, is increasingly dependent upon value added by services, as opposed to tangible goods. Vast amounts of people, including professionals (such as doctors, lawyers, accountants) and service providers (such as specially trained technicians and people with specialized skills or knowledge), are employed by a service industry instead of by a manufacturing or distribution industry that is commonly associated with consumer or durable goods. As the pace of knowledge and technical advances has increased, the demand for specialists with detailed knowledge in narrow fields has increased. This has led to an ever expanding market for such services. However, while some such professionals have banded together to market their services, and provide a mechanism by which their collective services can be accessed, the distribution of such services is still limited by geography and a fundamental lack of an easy, economical, and viable service brokerage for such services. Furthermore, while there have been great advances in the production and delivery of goods, such as the "just in time" concept, no such breakthrough has heretofore been made in the field of services.

Accordingly, a need exists for an improved method of distributing services of multiple service providers to end users via a service brokerage. This invention solves this need through the use of the Internet.

SUMMARY OF THE INVENTION

The present invention is generally directed to a method for allowing a user to access one of a plurality of service providers through a service brokerage via the Internet. The user is presented with a set of private service provider chat rooms that are on-line, and each of these rooms is associated with a service provider. The set of private service providers can optionally be selected according to a preselected criterion of the user. The user selects a chat room of a chosen service provider, obtains access to the chat room, and then privately interacts with the chosen service provider via the Internet. The chosen service provider can receive a user profile before the user enters that provider's chat room and control access to the chat room by rejecting the request of the user to enter the chat room. The user's account is charged with a user service fee, and the service provider's account is credited with a service provider fee, according to the length of time the user occupies the chat room.

In a first, separate aspect of the present invention, a user information file associated with the user is created with the service brokerage. The user information file can be made available to a chosen service provider who can modify the file. The user information file can also be transferred, along with the user, to a second service provider in a second chat room, who can also modify the file. The user can have access to the user information file after leaving any occupied chat room.

In another, separate aspect of the present invention, the user is presented with a schedule for a chosen chat room. The schedule can provide information as to when the chat room is expected to be on-line or unoccupied. The user can be allowed to sign a waiting list for when the chat room becomes available, and the user can receive automatic notification of such availability.

In yet another, separate aspect of the present invention, access to a chat room can be denied if the user account is below a predetermined threshold value, such as zero. An available amount of credit can be established in a user account by a payment from the user to the service provider, and the available credit can be reduced as the user account is charged a user service fee according to the length of time the user spends in an occupied chat room. The amount of time that a user can spend in a chat room can be limited by an available amount of credit or by a preselected threshold that cannot be exceeded within a preselected period of time absent a preselected approval process.

In still another, separate aspect of the present invention, a user account can be provided with coupons to reduce the user service fee for the user's access to one or more of the plurality of service providers according to a preselected criterion.

Accordingly, it is a primary object of the present invention to provide an improved method for allowing users to access a plurality of service providers through a service brokerage via the Internet.

This and further objects and advantages will be apparent to those skilled in the art in connection with the drawings and the detailed description of the preferred embodiment set forth below.

DETAILED DESCRIPTION OF THE PREFERRED EMBODIMENTS

Figure 1:
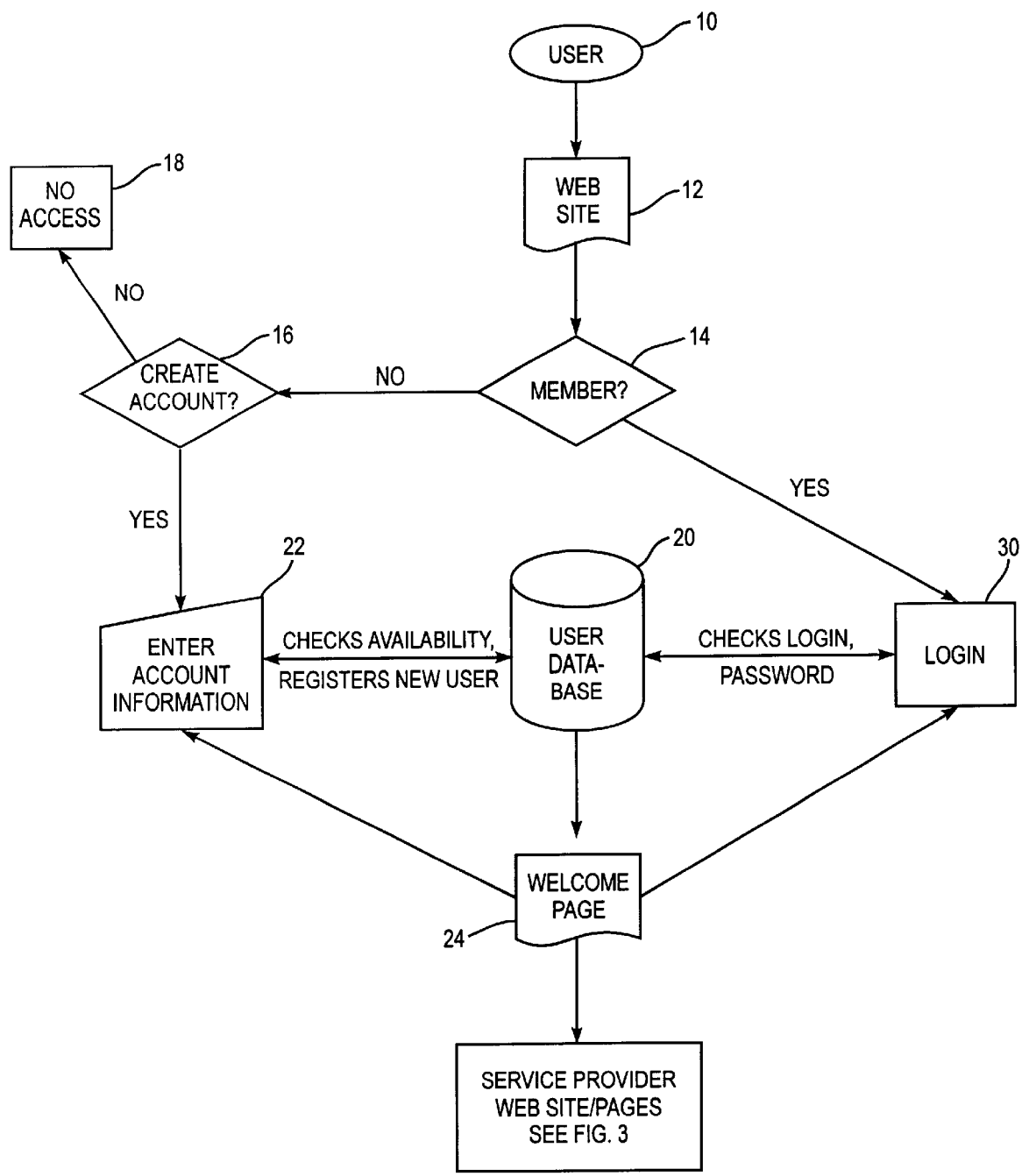
FIG. 1 is a flow chart depicting the user log-in process of the preferred embodiment.

In a preferred embodiment of the present invention, a service brokerage establishes a service provider web site and/or pages and chat rooms and is the "middleman" that acts to connect multiple users with multiple service providers over the Internet. The service brokerage can take any one of a number of forms. It can be a company that provides access to service providers within the company. It can be an association of independent service providers, such as a referral service. Or it can be a service brokerage that acts as a clearinghouse for allowing individual service providers and users to gain access to each other, much the same as a stock exchange acts as a brokerage for buying and selling stocks, except that the commodity is services instead of stocks.

The service brokerage establishes a relationship with multiple service providers. As part of this process, the service brokerage can develop an information file that is specific to an individual service provider. This file can contain a variety of information, such as the qualifications or references of the service provider, preferences of the service provider, areas of specialization of the service provider, dates the service provider is available, the time zone from which the service provider will be providing its services, limitations the service provider places on access to its services, rates of the service provider for its services, and so forth.

Once the service brokerage has a relationship with a service provider, the service brokerage can assign the service provider its own chat room and, if appropriate, its own service provider account. In an especially preferred embodiment, this account can automatically be credited with payments for services provided by the service provider through the service brokerage. The service provider can then access its account, or have some or all of the value of its account transferred to another account, such as an automatic payment to a specified account with a financial institution.

A "chat room" according to the present invention is defined as a location (such as a web site or web page) or means by which a user and a service provider can interact via the Internet. For example, several service providers currently provide chat rooms where multiple parties can gather and send messages to anybody within the group. Once a user is in a chat room, the interaction between the user and the service provider can take on any form of media communication now available, or available in the future, over the Internet. Thus, for example, the interaction could be by e-mail, by voice signal, by video image, or by a combination of such media.

It is especially preferred that the chat rooms of the present invention be private so that confidential information can be exchanged between the parties without the risk of exposure to unauthorized third parties. The privacy feature can be enforced by any number of different encryption procedures that are commonly available and that could be employed by a computer programmer with the aid of the disclosure of the present invention. The privacy feature is invoked once the chat room is closed to form an occupied chat room.

Once a service brokerage has multiple service providers, it is ready to begin offering those services to users who sign up for access to services with the service brokerage. As part of the sign up process, a user account is created with the service brokerage. During this process, the user will provide the service brokerage with pertinent billing information such as the user's name, address (mailing and e-mail) and, preferably, credit card information, and the user will choose a log-in name (if a pseudonym is desired) and password. In addition, the user will indicate his or her time zone, which will be useful in terms of scheduling future appointments.

As was the case with service providers, the service brokerage can develop an information file that is specific to an individual user. This file can contain a wide variety of information, such as the type of services the user may seek, preferences of the user, areas of specialized interest of the user, dates the user may typically seek services, limitations the user may wish to place on the qualifications of service providers, personal history or data regarding the user, or even personal data files or pictures provided by the user, and so forth.

Once the service brokerage has a relationship with a user, the service brokerage can assign the user its own user account. To begin receiving services, the user must establish a credit or credit line in its user account, or the service brokerage and the user must agree to a payment mechanism, such as periodic billing, by which the user will pay for services that it receives. A preselected threshold of available credit in a user account can be established by the service brokerage and/or the user, so that the threshold cannot be exceeded within a preselected period of time absent a preselected approval process. For example, the service brokerage could limit the user to a preselected threshold of $1,000 dollars within a month. Once that amount is exceeded, no additional credit would be available until receipt of payment or a signed copy of a bill for services already rendered so as to ensure the lack of any unauthorized activity in the user account.

In its simplest form, the user account can be charged with a user service fee for the length of time spent by the user in the occupied chat room. Such a charge can be based upon actual timed usage, a unit of time usage, or even a preset not to exceed a threshold unit of time usage. Although the user can be charged a user service fee after the user leaves an occupied chat room, it is especially preferred that the user account be automatically debited with payments for services provided through the service brokerage as they are being provided. The service charge can be reduced by coupons provided to the user account.

As an example of a charge based upon actual timed usage, the user service fee can be based upon a fixed per minute rate that can easily be calculated and automatically charged to the user account.

As an example of a unit of time usage (which is longer than the minute of time usage, which is itself really a very short blocked increment of time), the user service fee can be based upon threshold limits or blocked increments of time. In this situation, a user service fee can be established for blocks of time and the user service fee can be charged to the user when the increment of time begins, whether it is completely used or not. Thus, for example, if the user service fee is based upon a ten minute block of time, and the user remains in an occupied chat room for thirty-three minutes, the user's account will be charged four user service fees of ten minutes each while the user is in the occupied chat room.

As an example of a blocked unit of time usage, the service fee can be based upon a fixed entry fee to the chat room. In such a scenario, the session with the service provider can automatically terminate at the conclusion of the session of a fixed length of time. An example of such a service fee might be a one hour session with a service professional.

If the user service fee is not based upon a blocked unit of time usage, the time that a user can spend in an occupied chat room can be limited based upon a predetermined threshold level. For example, the user can be kicked out of an occupied chat room if the amount of available credit in the user account goes below a specified value, such as zero, or the user exceeds a predetermined threshold level of spending for the user's account.

Once a user has a user account with the service brokerage, the service brokerage can generate a user profile of the user that can be provided to a service provider to allow that provider to determine whether the user should be allowed to enter the service provider's chat room. The service brokerage can also use a preselected criterion of the user to generate a set of private service provider chat rooms to present to the user. In an especially preferred embodiment, the user profile and user criteria can be combined to allow more accurate matches of the user to a desired service provider.

Once a user is allowed to enter a chat room of a service provider by the service provider, the chat room is closed to other users to form an occupied chat room. If another user tries to enter an occupied chat room, entry will automatically be denied. However, a user desiring entry into an occupied chat room can be given a schedule that provides information as to when the room is expected to be unoccupied. The user can also be allowed to sign a waiting list for when the chat room becomes available. When the chat room does become available, the user desiring entry into the chat room can be notified that the chat room is now available. In a similar fashion, a user can be given a schedule of future times as to when the chat room is expected to be on-line, and notified when the chat room is on-line.

Depending upon the type of service being provided by the service provider, a considerable amount of time can be saved by allowing the service provider to view a user information file during the session with the user. The user information file can also allow a user to provide important information to the service provider to maximize the efficiency of the session with the service provider. In a preferred embodiment, the service provider can be allowed to modify the contents of the user information file while the user is in the service provider's chat room, and the user can be given access to the file after leaving the occupied chat room. In another especially preferred embodiment, the user and its user information file can also be transferred from a first chat room with a first service provider to a second chat room with a second service provider. In the second chat room, the user information can be further modified by the second service provider, and then returned to the user once the user leaves the second chat room.

To see how a user could benefit from this especially preferred embodiment, a system will hereinafter be described in the context of a hypothetical set of services provided by multiple service providers. In this hypothetical example, a user wants to receive advice about financial planning, the user's stock portfolio and maybe even some information about the tax consequences of any change to the user's portfolio of financial assets. In this example, the user might first access the chat room of a chose financial planner. Prior to entering the chat room, the user could complete a detailed questionnaire so as to set forth the details of all of his or her financial assets, personal data (such as number of dependents and possible requirements for future education of offspring) and key financial goals of the user. Once the user enters the first chat room, the financial planner could efficiently evaluate the user's portfolio and goals and make recommendations based upon the information that the user has previously put into the user's information file. For example, the financial planner might recommend that the user sell certain financial assets and invest in other categories of assets. Once the financial planner completes an evaluation of the user, the financial planner's recommendations can be entered in the user information file for future access by the user or another professional. If the user wants to immediately consider such changes, the user could be transferred to a professional investment analyst in a second chat room. This analyst could then pick up the user information file, evaluate the recommendations of the financial planner, and enter specific recommendations into the user's file for change in the user's financial portfolio. The user could then leave the second chat room to research the recommendations, or maybe even ask to be transferred to a third chat room to receive advice about the tax consequences if the user were to follow the specific recommendations of the professional investment analyst. Alternatively, the user might choose to seek a second opinion from a second professional investment analyst about modifications to the user's portfolio. Throughout this process, the service providers could interact with the user, and vice versa, to make sure that the user is receiving advice suited to the user's own individual preferences and needs. Thus, it is readily apparent that the method according to the present invention will allow a user to seek advice from several different professionals in a convenient, efficient, and expedient matter, assuming that the user has access to the proper set of service providers.

The preferred embodiment of the present invention will now be described in even greater detail by reference to FIGS. 1 through 5.

As shown in FIG. 1, a user 10 must initially access a web site 12 of the service brokerage (and this access would be via the Internet). Once the site is accessed, the site queries 14 whether the user is a member or not. If the user is not a member, the user 10 must either establish a user account 16 or be denied to services offered through the site 18. If an account is created, the information 22 is stored in a user database 20 and the user can proceed to a welcome page 24. If the user 10 is already a member, the user can proceed to the welcome page by a log-in process 30.

Figure 2:
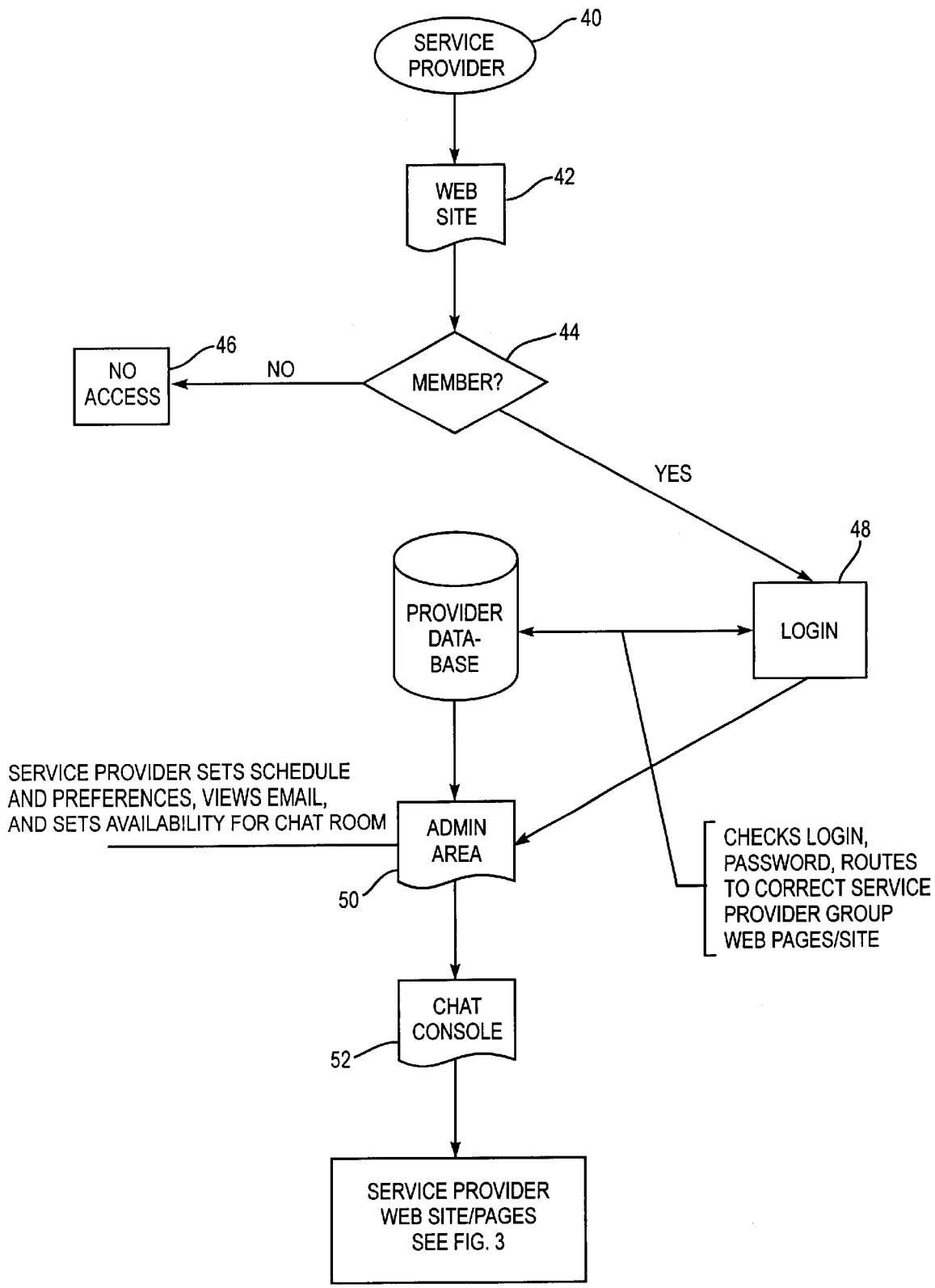
FIG. 2 is a flow chart depicting the service provider log-in process of the preferred embodiment.

FIG. 2 depicts the sign-in process for a service provider 40 (and this process would be via the Internet 42). If the service provider 40 is not a member of the service brokerage, the service provider is denied access 46. If the service provider is a member of the service brokerage, the service provider logs in 48 and then proceeds to an administrative area 50. The administrative area 50 is where the service provider 40 goes to set a schedule for the provider's services, to establish preferences for users, to view e-mail, and to establish the service provider's availability for a chat room. Once the service provider 40 is ready to begin providing services, the service provider 40 is routed to a chat console 52 where the service provider 40 waits until it agrees to allow a user to enter a chat room 52 with the service provider 40.

Figure 3:
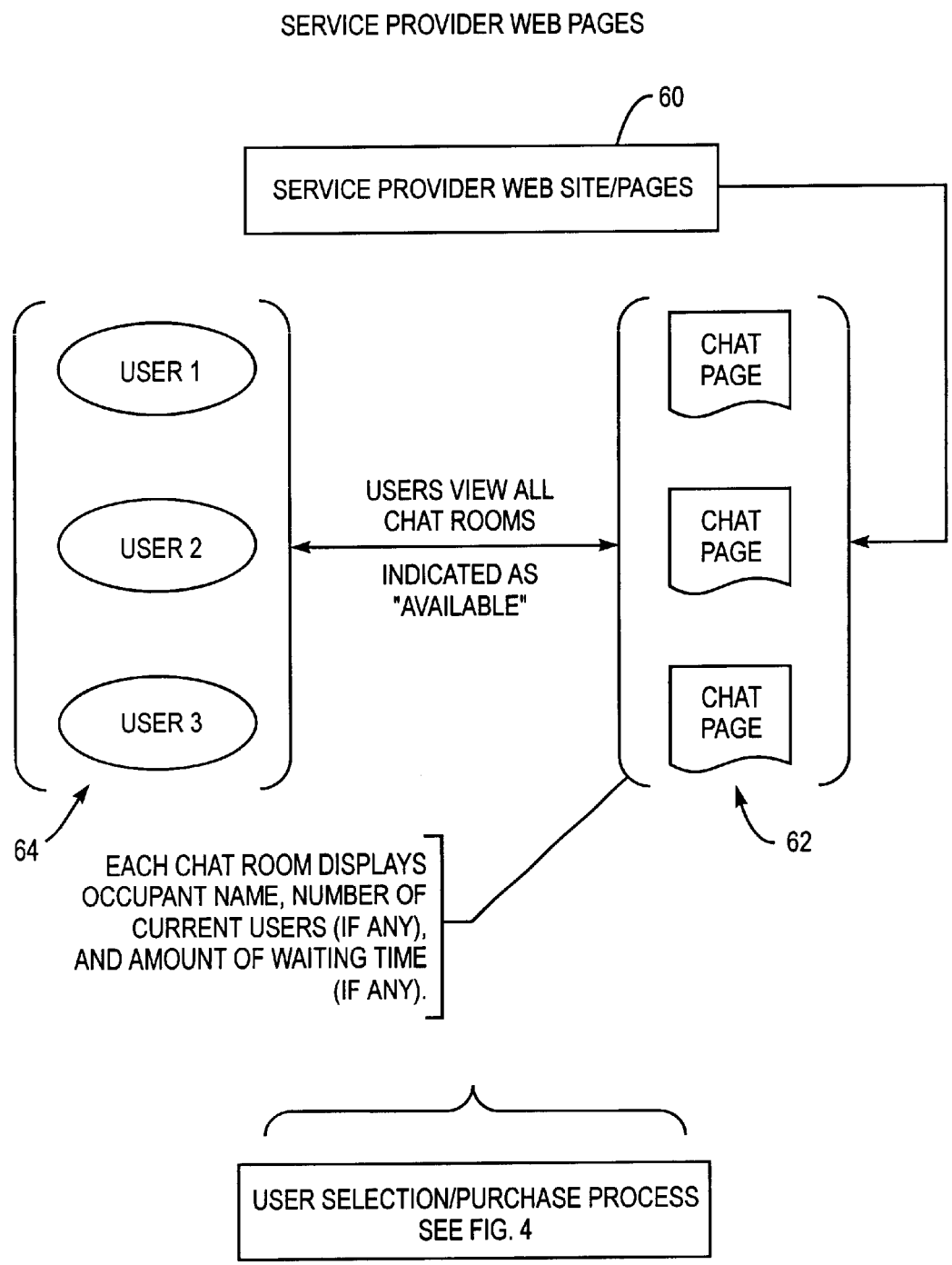
FIG. 3 is a flow chart depicting a service provider web site or pages of the preferred embodiment.

FIG. 3 depicts a collection of service provider web sites or pages 60 that can be made available to a user 10. Each chat room 62 can provide information about the service provider to potential users 64. Such information can include the name of the service provider 40, the number of current users signed up for the services of the service provider (if any), the estimated amount of waiting time before a user can gain access to the chat room (if any), and the user service fee associated with the services of the service provider. If criteria of individual users are used to create individual sets of service providers, then the service providers offered to different users may vary according to their preferences (or according to the preferences of the service providers).

Figure 4:
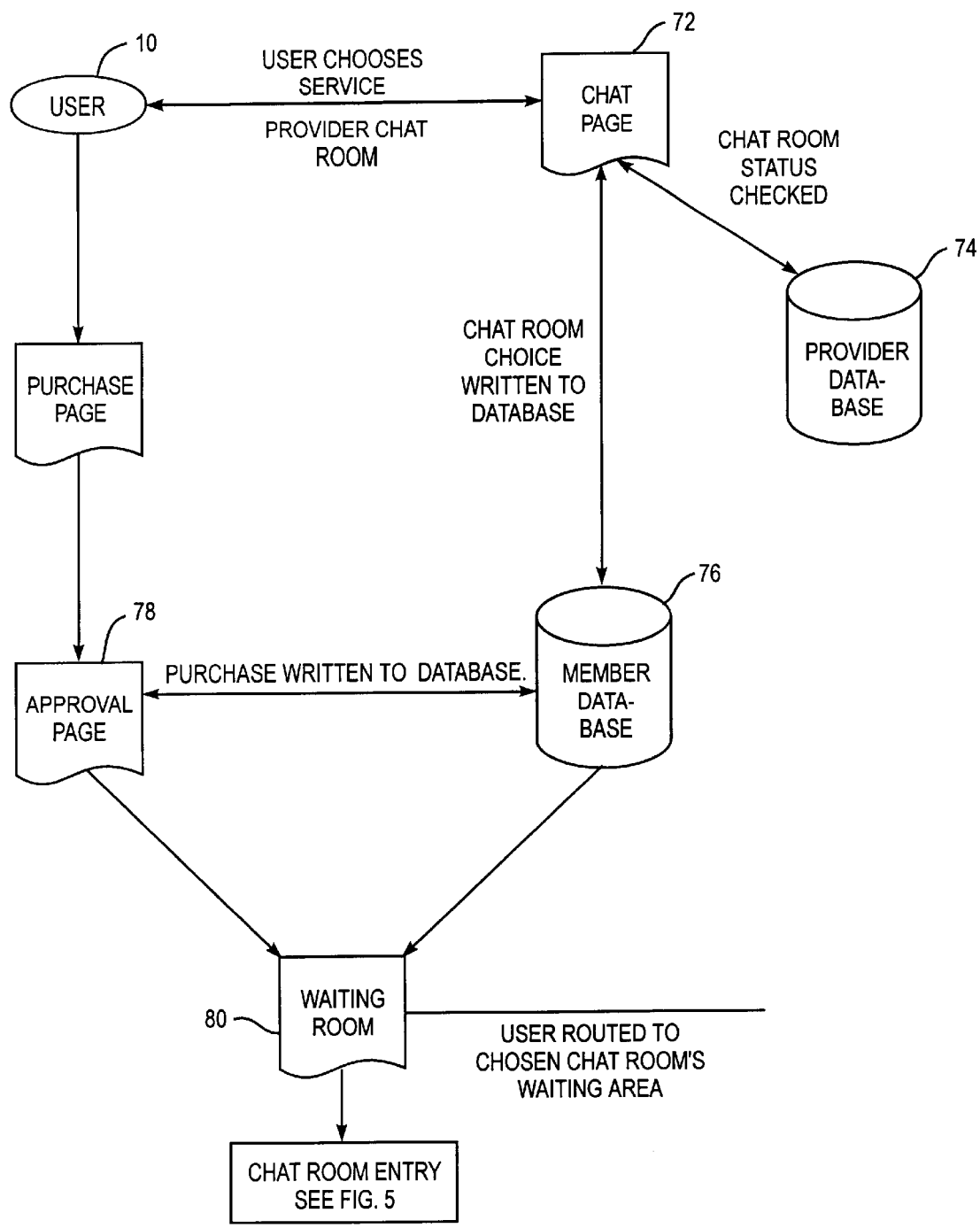
FIG. 4 is a flow chart depicting the user selection/purchase process of the preferred embodiment.

FIG. 4 depicts a user selection/purchase process for obtaining services of a chosen service provider. The user 10 views the chat page 72 of a chosen service provider and checks on the availability of the chat room through the provider database 74. Once the user 10 chooses to enter this chat room, the user's selection is provided to a member database 76 and is sent through the process of approving 78 the user's request with the service brokerage. Once the request is approved, the user 10 is directed to a waiting room or area 80 for the chat room of the chosen service provider 40.

Figure 5:
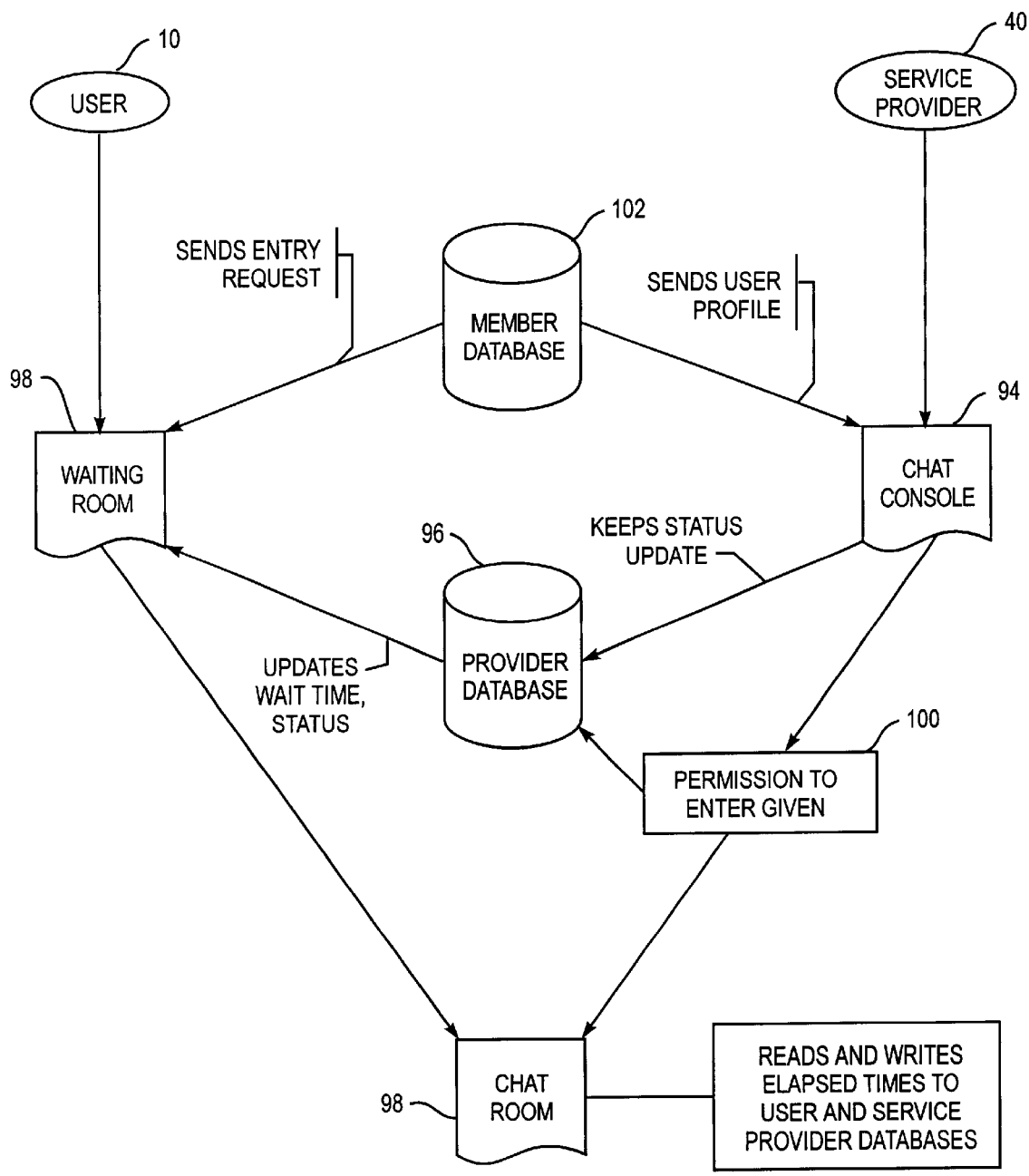
FIG. 5 is a flow chart depicting chat room entry in the process of the preferred embodiment.

FIG. 5 depicts how a user gains entry to a chat room after the user's request for entry to the chat room has been approved by the service brokerage. Once a user 10 enters a waiting room 92 for a chosen service provider's chat room, a request of the user to enter the chat room 98 is sent to the chat console 94 of the service provider 40, along with a user profile stored in member database 102. If the service provider gives the user 10 permission to enter the chat room 98, the service provider database 96 is updated and both the service provider 40 and the user 10 proceed to enter a chat room 98 that is then closed. A timer keeps track of the time that the chat room is occupied, and the user and the service provider databases, 102 and 96, are updated according to the time spent by the user 10 in the occupied chat room 98.

It will be readily apparent to those skilled in the art that still further changes and modification in the actual concepts described herein can readily be made without departing from the spirit and scope of the invention as defined by the following claims. Accordingly, the present invention is not intended to be limited except as may be required by the lawful scope of the following claims.

What is claimed is:

1. A method for allowing a user to access a plurality of service providers through a service brokerage via the Internet, comprising the steps of:

establishing a private service provider chat room for each of the plurality of service providers that connects the service provider to the service brokerage via the Internet;

establishing a user account with the service brokerage;

logging the user into the service brokerage via the Internet;

presenting the user with a set of private service provider chat rooms that are on-line, each of said chat rooms being associated with a service provider selected from the plurality of service providers;

allowing the user to select a first chat room of a chosen service provider selected from the set of private service provider chat rooms and request entry into the first chat room;

allowing the chosen service provider to open the first chat room to the user and then closing the first chat room to form an occupied chat room;

allowing the user and the chosen service provider to privately interact in the occupied chat room via the Internet;

timing the length of time the user spends in the occupied chat room; and charging the user account with a user's service fee for the length of time spent by the user in the occupied chat room.

2. A method as recited in claim 1, comprising the further steps of:

establishing a service provider account for each of the plurality of service providers; and crediting the chosen service provider's account with a service provider's fee for the length of time spent by the user in the occupied chat room.

3. A method as recited in claim 1, comprising the further step of creating a user information file with the service brokerage associated with the user.

4. A method as recited in claim 1, wherein the set of private service provider chat rooms is selected from the plurality of service providers according to a preselected criterion of the user.

5. A method as recited in claim 1, comprising the further steps of:

establishing an available amount of credit in the user account by a payment from the user to the service provider;

reducing the available amount of credit in the user account as the user account is charged the user service fee while the user is in the occupied chat room; and limiting the amount of time that the user can spend in the occupied chat room based upon the available amount of credit in the user account.

6. A method as recited in claim 5, comprising the further step of establishing a preselected threshold of available credit that cannot be exceeded within a preselected period of time absent a preselected approval process.

7. A method as recited in claim 1, wherein the user account is charged the user service fee while the user is in the occupied chat room.

8. A method as recited in claim 7, comprising the further step of:

denying the user further access to the occupied chat room if the user account is below a predetermined threshold value.

9. A method as recited in claim 8, wherein the predetermined threshold value is zero.

10. A method as recited in claim 1, comprising the further step of presenting the user with a schedule for theist chat room.

11. A method as recited in claim 10, wherein the schedule provides information as to when the first chat room is expected to be on-line.

12. A method as recited in claim 10, wherein the schedule provides information as to when the first chat room is expected to be unoccupied.

13. A method as recited in claim 10, comprising the further step of allowing the user to sign a waiting list for when the first chat room becomes available.

14. A method as recited in claim 13, comprising the further step of notifying the user when the first chat room becomes available.

15. A method for allowing a user to access a plurality of service providers through a service brokerage via the Internet, comprising the steps of:

establishing a private service provider chat room for each of the plurality of service providers that connects the service provider to the service brokerage via the Internet;

establishing a user account with the service brokerage;

logging the user into the service brokerage via the Internet;

creating a user information file with the service brokerage associated with the user;

presenting the user with a set of private service provider chat rooms that are on-line, each of said chat rooms being associated with a service provider selected from the plurality of service providers;

allowing the user to select a first chat room of a chosen service provider selected from the set of private service provider chat rooms and request entry into the first chat room;

allowing the chosen service provider to open the first chat room to the user and then closing the first chat room to form an occupied chat room;

allowing the user and the chosen service provider to privately interact in the occupied chat room via the Internet;

providing the chosen service provider in the occupied chat room with the user information file;

timing the length of time the user spends in the occupied chat room;

charging the user account with a user's service fee for the length of time spent by the user in the occupied chat room; and creating a user information file with the service brokerage associated with the user, wherein the user information file is available to the chosen service provider in the occupied chat room.

16. A method as recited in claim 15, wherein the chosen service provider can modify the user information file while the user is in the occupied chat room.

17. A method as recited in claim 16, wherein the user has access to the user information file after the user leaves the occupied chat room.

18. A method as recited in claim 16, comprising the further steps of:

transferring the user from the occupied chat room to a second chat room associated with a second service provider;

timing the length of time the user spends in the second chat room; and charging the user account a second user service fee for the length of time spent by the user in the second chat room.

19. A method as recited in claim 18, wherein the user information file is available to the second service provided the second chat room.

20. A method as recited in claim 19, wherein the user has access to the user information file after the user leaves the second chat room.

21. A method for allowing a user to access a plurality of service providers through a service brokerage via the Internet, comprising the steps of:

establishing a private service provider chat room for each of the plurality of service providers that connects the service provider to the service brokerage via the Internet;

establishing a user account with the service brokerage;

logging the user into the service brokerage via the Internet;

presenting the user with a set of private service provider chat rooms that are on-line, each of said chat rooms being associated with a service provider selected from the plurality of service providers;

allowing the user to select a first chat room of a chosen service provider selected from the set of private service provider chat rooms and request entry into the first chat room;

allowing the chosen service provider to open the first chat room to the user and then closing the first chat room to form an occupied chat room;

providing the chosen service provider with a user profile of the user once the user selects the first chat room;

allowing the user and the chosen service provider to privately interact in the occupied chat room via the Internet;

timing the length of time the user spends in the occupied chat room; and charging the user account with a user's service fee for the length of time spent by the user in the occupied chat room, wherein the chosen service provider is provided with a user profile of the user once the user selects the first chat room.

22. A method as recited in claim 21, wherein the chosen service provider can reject the request of the user to enter the first chat room.

23. A method as recited in claim 21, wherein the user profile is comprised of a file that is provided to the service brokerage by the user.

24. A method for allowing a user to access a plurality of service providers through a service brokerage via the Internet, comprising the steps of:

establishing a private service provider chat room for each of the plurality of service providers that connects the service provider to the service brokerage via the Internet;

establishing a user account with the service brokerage;

logging the user into the service brokerage via the Internet;

presenting the user with a set of private service provider chat rooms that are on-line, each of said chat rooms being associated with a service provider selected from the plurality of service providers;

allowing the user to select a first chat room of a chosen service provider selected from the set of private service provider chat rooms and request entry into the first chat room;

allowing the chosen service provider to open the first chat room to the user and then closing the first chat room to form an occupied chat room;

providing the chosen service provider with a user profile of the user once the user selects the first chat room;

allowing the user and the chosen service provider to privately interact in the occupied chat room via the Internet;

timing the length of time the user spends in the occupied chat room;

charging the user account with a user's service fee for the length of time spent by the user in the occupied chat room, providing the user with a coupon to reduce the user service fee for the user's access to one or more of the plurality of service providers according to a preselected criterion.

\* \* \* \* \*